United States Patent

Kishiro et al.

[11] Patent Number: 5,796,010
[45] Date of Patent: Aug. 18, 1998

[54] CORIOLIS MASS FLOWMETER

[75] Inventors: Masami Kishiro; Hironobu Yao, both of Kawasaki, Japan

[73] Assignee: Fuji Electric Co., Ltd., Kanagawa, Japan

[21] Appl. No.: 613,007

[22] Filed: Mar. 8, 1996

[30] Foreign Application Priority Data

Mar. 9, 1995 [JP] Japan ................. 7-049371

[51] Int. Cl.$^6$ ........................................... G01F 1/84
[52] U.S. Cl. ........................................... 73/861.357
[58] Field of Search ................ 73/861.355, 861.356, 73/861.357

[56] References Cited

U.S. PATENT DOCUMENTS

| 4,831,885 | 5/1989 | Dahlin . | |
|---|---|---|---|
| 5,287,754 | 2/1994 | Kazakis . | |
| 5,307,689 | 5/1994 | Nishiyama et al. . | |
| 5,323,658 | 6/1994 | Yao et al. | 73/861.357 |
| 5,365,794 | 11/1994 | Hussain et al. | 73/861.357 |
| 5,381,697 | 1/1995 | Van Der Pol | 73/861.357 |
| 5,398,554 | 3/1995 | Ogawa et al. | 73/861.355 |
| 5,531,126 | 7/1996 | Drahm | 73/861.356 |

FOREIGN PATENT DOCUMENTS

| 0250706 | 1/1988 | European Pat. Off. . |
| 0282217 | 9/1988 | European Pat. Off. . |
| WO9303336 | 2/1993 | WIPO . |

Primary Examiner—Richard Chilcot
Assistant Examiner—Jewel Thompson
Attorney, Agent, or Firm—Spencer & Frank

[57] ABSTRACT

A Coriolis mass flowmeter includes a housing which contains at least one measuring pipe, a supporting mechanism connected to both ends of the measuring pipe, a vibration generator which vibrates the measuring pipe, at least two sensors for detecting the vibration of the measuring pipe, an inlet conduit which introduces a fluid to be measured into the measuring pipe and an outlet conduit which discharges the fluid out of the measuring pipe. A Corioli vibration is applied to the measuring pipe which generates a Coriolis force in the fluid flowing in the measuring pipe. The Coriolis force is utilized for the measurement of the flow rate of the fluid. The Coriolis vibration has a frequency higher than the principal natural frequency of the supporting mechanism, i.e., in an inertial control region. The mass flowmeter is of a simple structure and lightweight, minimizes leakage of the energy of vibration to the outside, and has a high mechanical Q value.

26 Claims, 11 Drawing Sheets

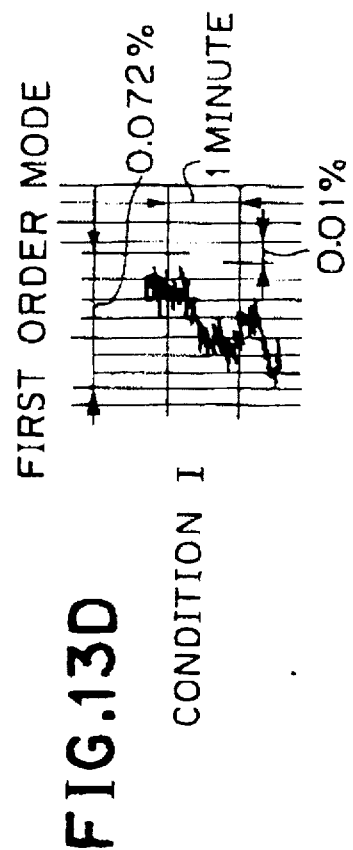
FIG.13D CONDITION I
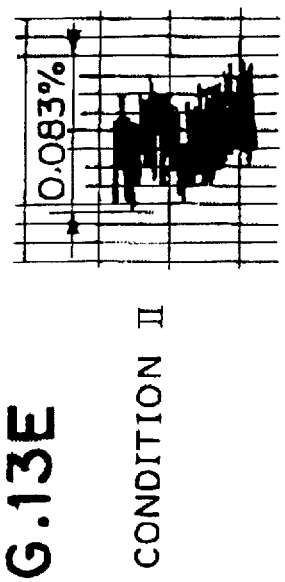
FIG.13E CONDITION II
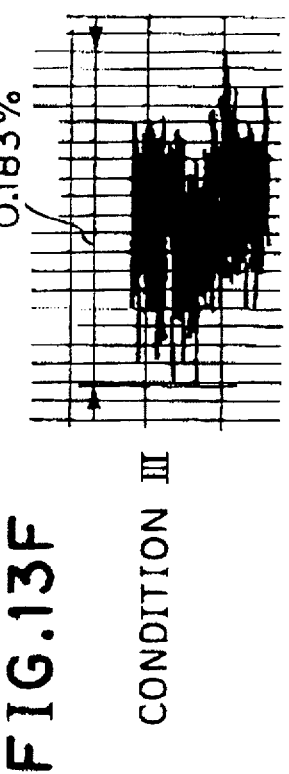
FIG.13F CONDITION III
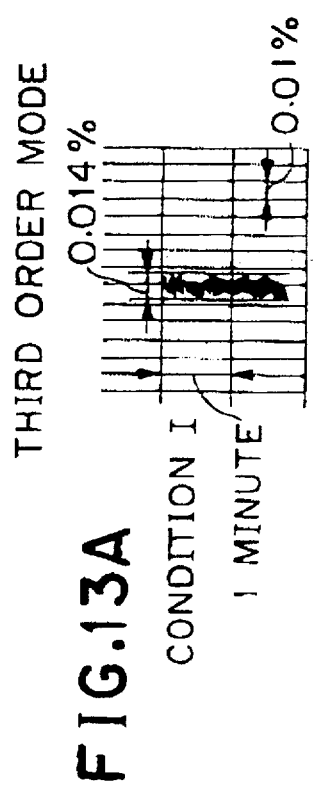
FIG.13A CONDITION I
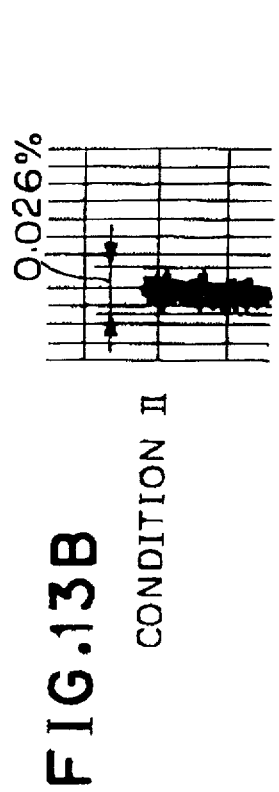
FIG.13B CONDITION II
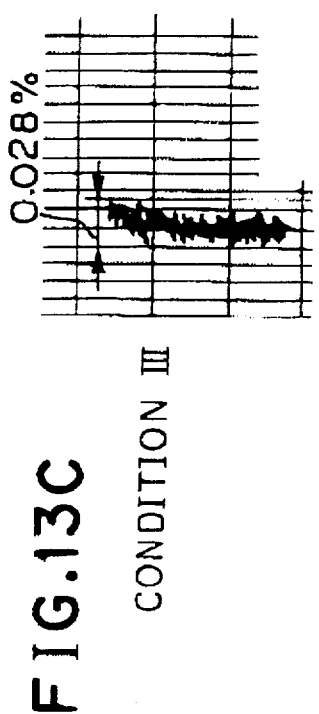
FIG.13C CONDITION III

CORIOLIS MASS FLOWMETER

BACKGROUND OF THE INVENTION

1. Field of the Invention

The present invention relates to a mass flowmeter which measures mass flow utilizing Coriolis' force generated in proportion to the mass flow of a fluid flowing in at least one pipe which is vibrated, and more particularly to a mass flowmeter which is lightweight and simplified in structure and which enables improved handiness, reliability, and precision of measurement.

2. Description of Prior Art

As is well known, a Coriolis mass flowmeter is a direct measurement type mass flowmeter which measures mass flow utilizing Coriolis' force generated in proportion to the mass flow of a fluid flowing in a vibrating pipe to be measured. Accordingly, it enables high precision measurement of mass flow.

Generally, mass flowmeters of this kind are roughly grouped into two types. One is a mass flowmeter which has a curved measuring pipe such as a U-shaped or S-shaped one, and the other is a mass flowmeter which has a straight measuring pipe. Also, there are a mass flowmeter of the type in which two vibrating measuring pipes are provided and a fluid to be measured is separated into two streams which are led to two measuring pipes, a mass flowmeter of the type which has two measuring pipes that are continuously connected to each other and that are resonant with each other, and a mass flowmeter of the type which has a single measuring pipe.

Of the above-described mass flowmeters, the one which includes a single straight pipe mass flowmeter, i.e., the passage for the fluid to be measured in the measurement device inclusive of its inlet portion and outlet portions for the fluid is in the form of a straight pipe as the entire structure of the mass flowmeter, not only has a low fluid resistance, that is, shows a small loss in pressure, but also forms no fluid pool inside the detector so that cleaning of the inside of the measuring pipe can be performed with ease. Further, as compared with the mass flowmeters which have a curved measuring pipe or a plurality of measuring pipes, the single measuring pipe mass flowmeter has a simplified structure and, hence, manufacturing costs can be reduced. However, it has the following problems.

Generally, in Coriolis mass flowmeters, a vibration is imparted to the measuring pipe, which vibration is such that Coriolis' force is generated when a fluid flows in the measuring pipe. The vibration allows measurement of a fluid by means of Coriolis' force (hereafter, referred to as "Coriolis', vibration") in order to measure the flow rate of the fluid which flows in the measuring pipe. It is generally the case that in order to stabilize the Coriolis vibration, i.e., to stabilize the measurement, the measuring pipe is vibrated at its natural frequency (or principal frequency).

When a single measuring pipe is used, there arise two problems.

Firstly, in the case where a plurality of measuring pipes are used, they are arranged in a symmetrical structure such as a tuning fork so that the vibration or oscillation energy of the measuring pipe will not leak to the external system easily, thus giving high vibrational Q. On the other hand, with a single measuring pipe, the vibrational energy of the measuring pipe will leak to the external system through a fixation portion of the measuring pipe. Accordingly, high vibrational Q is difficult to obtain. This leads to unstable Coriolis vibration and, hence, unstable measurements of mass flow.

Secondly, a plurality of measuring pipes to be used can be arranged in a differential structure to cancel the effect of external vibrations. In contrast, with a single measuring pipe, no differential structure can be adopted and, hence, the mass flowmeter with a single measuring pipe tends to be affected by external vibrations.

Various efforts have been made to solve the above-described problems.

For example, U.S. Pat. 4,831,885 (hereafter, the first conventional technique) discloses a mass flowmeter in which a measuring pipe is held by a strong, rigid member called a "housing". This structure reduces variation of the portion of the measuring pipe where it is held and achieves a state resembling a "node", so that the measuring pipe is allowed to generate Coriolis vibration having a relatively high mechanical Q. However, this approach involves suppression of the vibration of the measuring pipe by the rigidity of the housing and, hence, raises the problem that the housing must be large and heavy.

In addition, various other problems occur. Although the position of the measuring pipe where it is held resembles the state of a node, the energy of vibration leaks. As a result, loss of vibrational energy increases to an undesirable extent and decreases the mechanical Q of the vibration when the mass flowmeter is connected to a flange or like means for connecting it to external piping through a relatively short conduit. As a result, stable vibration cannot be obtained or the conditions of vibration change due to a stress applied by an external pipe arrangement.

In order to solve these problems, further efforts have been made. For example, Japanese Patent Application Laying-open No. 178217/1983 (hereafter, referred to as the "second conventional technique") discloses a mass flowmeter having the following construction: In the mass flowmeter according to the second conventional technique, a vibrating conduit in which a fluid to be measured flows is fixed at both ends thereof to a first base so that the vibrating conduit can be fixed rigidly in the axial direction. On the other hand, the first base and a second base to which an external conduit is fitted are connected to inlet and outlet pipe couplings each of which is held softly at both ends thereof with respective O-rings. Thus, the pipe arrangement and the vibrating conduit are separated from each other with respect to vibration, so that leakage of the vibrational energy of the vibrating conduit from the fixation portion to the external system, as was observed in the mass flowmeter according to the first conventional technique, can be prevented. Furthermore, strains or vibrations which are transmitted from the outer pipe arrangement can be isolated to achieve vibrational characteristics which are less affected by vibrations of external systems.

However, in the second conventional technique described above, stabilization of the vibration of the measuring pipe was effected by fixing the measuring pipe to the first base, which is rigid as in the mass flowmeter according to the first conventional technique. Accordingly, the attempts to increase the Q value of the Coriolis vibration of the measuring pipe result in an increase in the weight of the base as in the case of the housing as described above.

In the second conventional technique, the measuring pipe is supported softly with an organic material such as O-ring material and thus the elasticity and viscosity tend to change with time, so that it is difficult to insure stable characteristics for a long period of time and it is necessary to detach the mass flowmeter from the pipe arrangement when exchanging deteriorated O-rings.

Since, in the second conventional technique, the vibrating conduit or tube and the first base fixing thereto the vibrating tube, the first base being heavy as described above, are held softly by the second base fixing thereto the external piping, a strong force is urged onto the pipe couplings or O-rings to cause deformations thereto when external forces are applied to the device as by shocks, for example, during transportation of the device. Therefore, the mass flowmeter according to the second conventional technique uses a structure in which the first base is supported by the second base through another O-ring. However, even with this structure, the characteristics of the elastic material change with time so that the material becomes harder for the reasons described above, with the result that the characteristics of the O-ring and, hence, of the mass flowmeter deteriorate.

As a third type of conventional technique, there can be cited those mass flowmeters which are disclosed in U.S. Pat. 5,287,754 and Japanese Patent Application Laying-open No. 248912/1993. In the examples of these publications, the measuring pipes used are curved pipes. However, the techniques disclosed in the publications are applicable to straight measuring pipes.

In the mass flowmeters according to the third conventional technique, the Coriolis conduit in which a fluid to be measured flows is supported at both its ends by a supporter called a "carrier system" which is considered to have a rigidity higher than the Coriolis conduit as in the mass flowmeters according to first and second conventional techniques so that the natural frequency of the carrier system is higher than the natural frequency of the Coriolis conduit and the frequency of Coriolis vibration.

At the same time, the support is connected to the housing through the inlet and outlet conduits themselves to statically support the weight of the support and the natural frequency of the support is made higher than that of the entire mass flowmeter consisting of the Coriolis conduit, carrier system, and inlet and outlet conduits, so that on one hand the vibrational energy of the Coriolis conduit does not leak to the external system due to differences in natural frequency and, on the other hand, the mass flowmeter is isolated from external vibrations of the pipe arrangement.

With the above arrangement, the effects of deterioration with time of the elastic properties of the O-rings as in the mass flowmeter according to the second conventional technique can be avoided. However, the supporting of both ends of the Coriolis conduit by the carrier system, having a natural frequency higher than that of the Coriolis vibration, has the same effect as the supporting of the measuring pipe by the housing and bases in the mass flowmeters according to the first and second conventional techniques. Therefore, obviously the problem also arises that the carrier system must inevitably be sufficiently heavy.

In the above-described measure according to the third conventional technique, a heavy carrier system which is kept by the inlet and outlet conduits themselves is used, in contrast to the mass flowmeter according to the first conventional technique in which the inlet and outlet conduits are held softly through the O-rings. Naturally, the softness in supporting achieved in the third conventional technique is different from those attained according to the first and second conventional techniques. Further, when external forces as by shocks are applied to the mass flowmeter during transportation, there is an increased danger that the inlet and/or outlet conduit(s) may be damaged. In order to prevent such damage, a possible countermeasure would be to increase the rigidity of the inlet and outlet conduits or add an auxiliary support as in one of the examples of the third conventional technique as described above. However, this countermeasure leads to an increased natural frequency of the entire mass flowmeter, so that separation of vibrations due to differences in natural frequency is insufficient.

SUMMARY OF THE INVENTION

The present invention has been accomplished with a view to obviating the above-described problems of the conventional mass flowmeters.

An object of the present invention is to provide a mass flowmeter which is of a simple construction, is lightweight, easy to handle, and does not allow the energy of Coriolis vibration to leak to an external system so that a vibration system having a high mechanical Q value can be realized.

Another object of the present invention is to provide a mass flowmeter which is lightweight in the entire structure of a vibration system so that there can be avoided the occurrence of large displacements of the measuring pipe due to an impact force during transportation or due to external vibrations of low frequencies to prevent damage of the measuring tube.

Still another object of the present invention is to provide a mass flowmeter which has a measuring pipe with a high natural frequency so that the natural frequency of the measuring pipe can be isolated from the frequencies of noise due to external vibrations, thereby permitting adverse influences by noise due to external vibrations to be avoided by the frequency filtering effect of the vibration system itself, which has a high mechanical Q value.

In a first aspect of the present invention, there is provided a Coriolis mass flowmeter comprising:

a housing;

at least one measuring pipe contained in the housing, the at least one measuring pipe enabling measurement of the flow rate of a fluid which flows in the pipe under application of a vibration which generates a Coriolis force in the flowing fluid;

a supporting mechanism connected to both ends of the measuring pipe;

a vibration generator which gives a vibration to the measuring pipe;

at least two sensors for detecting vibration of the measuring pipe;

an inlet conduit which introduces a fluid to be measured into the measuring pipe; and an outlet conduit which discharges the fluid out of the measuring pipe;

wherein the Coriolis vibration applied to the measuring pipe has a frequency higher than a principal natural frequency of the supporting mechanism.

The Coriolis vibration applied to the measuring pipe may have a frequency which is at least $\sqrt{2}$ times as high as a principal natural frequency of the supporting mechanism.

The supporting mechanism may further comprise an additional mass.

The supporting mechanism and the additional mass may be integral to each other.

The Coriolis vibration applied to the measuring pipe may be of a higher order mode than the principal natural vibration mode of the measuring pipe.

The mass flowmeter may measure a flow rate of the fluid flowing through the measuring pipe based on a phase difference between signals from the at least two vibration sensors.

The at least two vibration sensors may each comprise a speed sensor.

At least two vibration sensors may each comprise an acceleration sensor.

The measuring pipe may comprise a straight pipe and the mass flowmeter may correct a flow rate value based on any two natural frequencies of the measuring pipe.

Two natural frequencies used for the correction of the flow rate may comprise natural frequencies of the Coriolis vibration in first and third order modes.

Two natural frequencies used for the correction of the flow rate may comprise natural frequencies of the Coriolis vibration in first and fifth order modes.

A signal component for the frequency of the first or fifth order mode vibration detected by the vibration sensors may be made smaller than a signal component for the frequency of the Coriolis vibration detected by the vibration sensors.

A signal component for the frequency of the first or fifth order mode vibration detected by the vibration sensors may be no higher than −40 dB.

According to the present invention, the frequency of Coriolis vibration of the measuring pipe is made higher than the principal natural frequency of the supporting mechanism which supports the measuring pipe, i.e., a so-called inertial control is used. This construction enables a mass flowmeter to be realized in a construction that is simple in structure, lightweight, and easy to handle, for example, in a mass flowmeter which uses a single straight measuring pipe, which exhibits a decreased displacement of the supporting mechanism without enlarging it or making it heavier, and which also minimizes leakage, if any, of the energy of Coriolis vibration to the outside so that stable vibration can occur, thus allowing measurements of mass flow under stabilized conditions By setting the frequency of Coriolis vibration of the measuring pipe to above the value of $\sqrt{2}$ times the principal natural frequency of the supporting mechanism, a structure can be realized in which leakage of the energy of vibration to the outside is smaller than in conventional apparatuses which use a so-called elastic control mechanism.

Further, an additional mass can be added to the supporting mechanism to decrease the principal natural frequency of the supporting mechanism and allow an increase in its inertial effect. In addition, fabrication of the supporting mechanism and additional mass as one piece, for example, by casting or die casting, results in a simplified structure.

Coriolis vibration of the measuring pipe in a higher order mode enhances the effect of inertial control and detecting a phase difference increases the sensitivity of the measuring apparatus to the mass flow rate. Increasing the frequency of the Coriolis vibration of the measuring pipe enables separation thereof from noise frequencies so that the S/N ratio increases. Using speed sensor or acceleration sensors further improves the S/N ratio.

According to the present invention, the support mechanism can be made compact and the rigidities of the inlet and outlet conduits can be made high so that the measuring device is resistant to impacts applied thereto during transportation or on some other occasions. Furthermore, increased sensitivity allows the amplitude of vibration of the measuring pipe to be decreased in order to reduce the stress of the measuring pipe. As a result, the mass flowmeter of the present invention can have an improved reliability. Further, use of a higher order mode, as compared with use of the primary or principal mode, decreases adverse effects on the sensitivity of the measurement of the mass flow rate due to axial force generated in the straight measuring pipe.

The influence of axial force on the sensitivity of measurement of the mass flow rate can be corrected by measuring two natural frequencies of different orders and obtaining the ratio of one to the other. In particular, this can be advantageously carried out by choosing Coriolis vibration in the third order mode of the measuring pipe and determining the axial force by the use of the ratio of the third order natural frequency of the Coriolis vibration to the first or fifth order natural frequency. Here, in the signal components detected by a vibration sensor, controlling the signal component of the first or fifth order natural vibration to a level sufficiently small, desirably no higher than −40 dB, as compared with the signal component of the Coriolis vibration, enables adverse influences of the first or fifth order natural vibration on the Coriolis vibration to be suppressed.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 13A to 13F are each a graph illustrating the fluctuation of a zero point of Coriolis vibration.

DETAILED DESCRIPTION OF THE INVENTION

Figure 1:
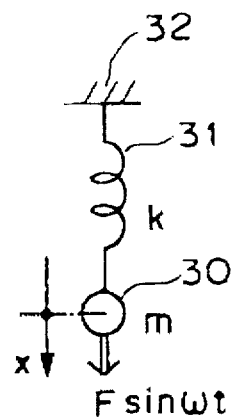
FIG. 1 is a schematic view illustrating the principle of the movement of a vibrational system.

The Coriolis mass flowmeter of the present invention, in contrast to the above-described conventional mass flowmeters, utilizes the phenomenon called "inertial control" or "mass control" (hereafter, "inertial control") in vibration science, and suppresses vibrational displacement of a fixed end of the measuring pipe by making the principal natural frequency of the supporting mechanism lower than the frequency of Coriolis vibration of the measuring pipe.

The above-described conventional mass flowmeters generally comprise a measuring pipe which is called a vibrating pipe, vibrating tube, Coriolis conduit or the like, in which a fluid to be measured flows, and have configurations in which both ends of the measuring pipe are fixedly supported on a supporting mechanism, called a housing, base or carrier system. The supporting mechanism has a sufficiently high rigidity not to be deformed by a force statically determined which deforms and vibrates the measuring pipe in order to prevent leakage of the energy of the Coriolis vibration given to the measuring pipe to the external system and in order to realize a stable Coriolis vibration having a high vibrational Q value.

Particularly, in the first and third conventional techniques described above, reference is made to the natural frequency of the supporting mechanism and, hence, it would seem that consideration has been given to dynamic deformations including the vibration of the supporting mechanism. Actually, however, it was presupposed that the natural frequency of the supporting mechanism was higher than the frequency of the measuring pipe. This means that the displacement of the member is suppressed predominantly by its rigidity, which is called elastic control in the vibration science. In other words, the conventional measuring devices resembles a static system in substance.

On the other hand, in a Coriolis mass flowmeter which vibrates and relatively displaces two or more symmetrical measuring pipes, not only static forces but also inertial forces balance so that no force leaks to the external system. As a result, if the connecting point of the two measuring pipes is connected to external piping, no substantial decrease in vibrational Q value is observed.

However, when a supporting mechanism having a high rigidity is used for connection as in a Coriolis mass flowmeter with a single measuring pipe, the inertial force of the vibrating measuring pipe does not balance and an external force is generated. In this case, if the connecting point of the measuring pipe with the supporting mechanism is connected to external piping, the connection point is displaced with respect to the external piping, with the result being that the energy of the Coriolis vibration leaks to the external system. This leakage of the energy decreases the Q value of Coriolis vibration, so that not only is the stability of the resonance frequency aggravated, but also the measuring pipe becomes vulnerable to influences such as stresses from the external piping.

In order to suppress this phenomenon, according to the present invention, there is used a so-called inertial control region in which the frequency of the Coriolis vibration of the measuring pipe is made to be higher than the principal natural frequency of the supporting mechanism, in contrast to the conventional mass flowmeters in which the static rigidity of the supporting mechanism is made high as described above.

Here, an explanation will be made of elastic control and inertial control with reference to an example of a simple vibration system as shown in FIG. 1.

FIG. 1 shows an example of a non-attenuated vibration system which comprises a mass point 30 with a mass of m attached to one end of a spring 31, another end of which in turn is attached to a solid wall 32 which does not move. The mass point 30 moves only in the direction X, or up and down in FIG. 1. The amount of displacement of the mass point 30 is defined as x. Then, the natural frequency, $\omega n$, of the vibration system is known to be expressed by equation (1) below:

$$\omega n = \sqrt{k/m} \qquad (1)$$

wherein k is a constant.

Assuming a dynamic external force $F \cdot \sin\omega t$ (where F is the amplitude of the external force, $\omega$ is the angular frequency of the external force, and t is time) is applied to the mass point 30, then the displacement x is expressed by equation (2) below:

$$x = F \cdot \sin\omega t/(k - m\omega^2) \qquad (2)$$

Figure 2:
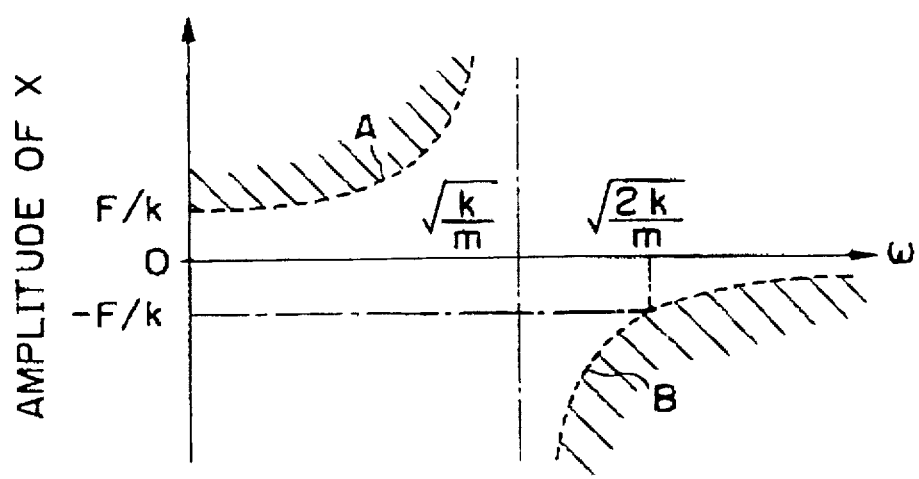
FIG. 2 is a graph illustrating a relationship between the angular frequency of an external force and the displacement a mass.

FIG. 2 is a graphical representation of the equation (2) above, in which the horizontal axis indicates the angular frequency $\omega$ of an external force and the vertical axis indicates the amplitude of displacement x.

In FIG. 2, Curve A represents a boundary of an elastic control region which corresponds to a condition where the external force has an angular frequency of $\omega < \omega n$. In the elastic control region, the smaller the angular frequency $\omega$ of the external force than the natural frequency $\omega n$ of the vibration system, the smaller the amplitude of displacement x. However, the minimum value of the amplitude of displacement x is F/k, which is not zero.

Curve B in FIG. 2 represents a boundary of an inertial control region where the external force has an angular frequency of $\omega > \omega n$. In the inertial control region, the amplitude of displacement x is assigned a negative sign (−), which indicates that the external force and the displacement x are in inverted phases to each other.

In the inertial control region, the higher the angular frequency $\omega$ of the external force than the natural frequency $\omega n$ of the vibrating system, the smaller the displacement x. However, when the following condition is met:

$$\omega = \sqrt{2k/m} = \sqrt{2} \cdot \omega n$$

then, the amplitude of displacement x equals to −F/k, which is the same value as the minimum value in the elastic control region. Furthermore, the displacement x approaches zero (0) as the angular frequency $\omega$ increases, so that the displacement x becomes smaller than in the elastic region.

Thus, in the inertial control region, the displacement x can be made smaller than in the elastic region when the condition $\omega > \sqrt{2} \cdot \omega n$ is met.

Applying the theory about the difference between the elastic region and inertial region as described above to a mass flowmeter, the mass point 30 and the spring 31 in FIG. 1 correspond to a supporting mechanism for a measuring pipe and the natural frequency $\omega n$ of the vibrating system may be deemed to be the principal natural frequency of the supporting mechanism. The external force $F \cdot \sin\omega t$ is ascribable to the Coriolis vibration of the measuring pipe applied to the supporting mechanism and thus the displacement x may be deemed to be the displacement of the supporting mechanism accompanied by the Coriolis vibration of the measuring pipe.

To set the principal natural frequency $\omega n$ at high levels as in the conventional techniques results in setting the condition $\omega < \omega n$ for the frequency $\omega$ of an external force, i.e., the Coriolis vibration of the measuring pipe. This means that the vibration occurs in She elastic control region. Increasing the rigidity of the supporting mechanism to increase the principal natural frequency $\omega n$ amounts to making $\omega$ relatively small as compared with $\omega n$ in the elastic control region, so that the displacement of the supporting mechanism is made small to minimize leakage of the energy of the vibrating system to an external system. In this conventional approach, not only must the supporting mechanism be large and heavy in order to increase the rigidity of the supporting mechanism, but also the amplitude of displacement x is not smaller than F/k.

In contrast to the above, in the present invention, the frequency ω of the Coriolis vibration of the measuring pipe is made higher than the principal natural frequency ωn of the supporting mechanism so that the inertial control region can be used. In the inertial control region too, the condition that ω is higher than ωn (ω>ωn) allows the displacement x of the supporting mechanism to be made small just as in the elastic control region so that leakage of the energy of the vibration system to the outside can be minimized. In this case, the rigidity of the supporting mechanism can be decreased to the minimum value that is required so that the supporting mechanism can be as lightweight as possible. This is one of the advantages of the mass flowmeter of the present invention over the conventional techniques. Another advantage of the present invention is that when the inertial control region is used, use of an increased frequency ω of the Coriolis vibration of the measuring pipe to a level of +e,fra √2+ee times as high as the principal natural frequency ωn of the supporting mechanism allows the displacement x of the supporting mechanism to decrease to a level smaller than that attained by the conventional approach in which the principal natural frequency Wn of the supporting mechanism is increased in the elastic region.

Further, the mass flowmeter can be configured so that an additional mass is added as long as the supporting mechanism is not too heavy. In this construction, m can be increased without increasing k in equation (1) above. This feature is effective in decreasing the principal natural frequency ωn of the supporting mechanism and the effect of the inertial control can be enhanced. In this case, the structure of the mass flowmeter can be simplified when the supporting mechanism and the additional mass are fabricated solidly by casting, die casting or the like method.

In addition, according to the present invention, excellent characteristics as mentioned below can be realized by allowing the Coriolis vibration of the measuring pipe to occur at natural frequencies higher than those of the principal mode of the measuring pipe.

Figure 3A:
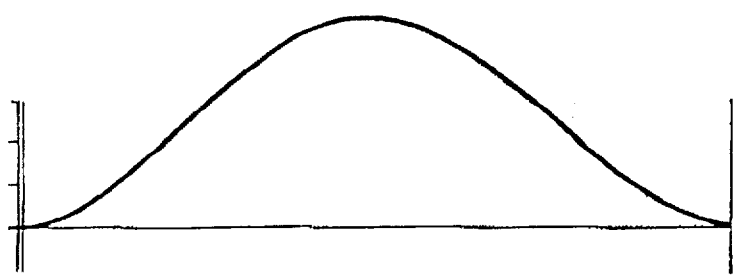
FIGS. 3A to 3D are graphs illustrating the wave forms of flexural vibrations.
Figure 3B:
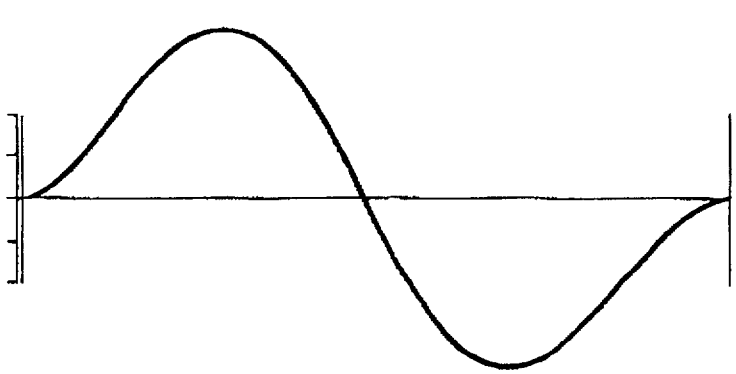
Figure 3C:
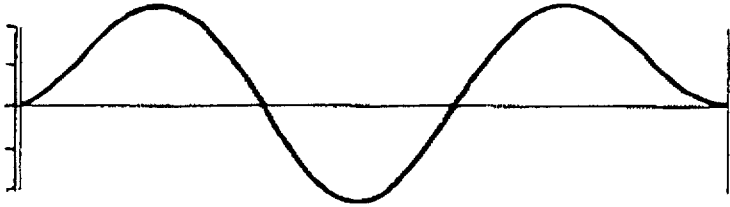
Figure 3D:

As is well known, the natural frequencies of the measuring pipe include in addition to that of a principal mode (first order mode), those of innumerable higher order vibration modes. FIGS. 3A to 3D are graphical illustrations of wave forms in various vibration modes of a flexural vibration or Coriolis vibration of a straight beam fixed at both ends thereof and having a uniform cross section along the longitudinal axis thereof. FIG. 3A illustrates the wave form of a first order mode. FIG. 3B illustrates the wave form of a second order mode. FIG. 3C illustrates the wave form of a third order mode. FIG. 3D illustrates the axes of coordinates for the graphs in FIGS. 3A to 3C. As illustrated in FIGS. 3B and 3C, Coriolis vibrations at higher order natural frequencies have increased natural frequencies with respect to the first order mode vibration. For example, the natural frequency of the second order mode vibration is 2.8 times as high as the frequency of the first order vibration while the third order mode vibration has a natural frequency by 5.4 times as high as the frequency of the first order mode vibration. As a result, the use of the higher order mode vibrations is effective in the inertial control.

As will be understood from the above-described explanation, use of a higher frequency of Coriolis vibration of the measuring pipe has been considered disadvantageous conventionally. For example, U.S. Pat. No. 5,287,754 cited above indicates that an increase in the frequency of the Coriolis vibration of the measuring pipe is disadvantageous in a mass flowmeter of the straight pipe type. However, the investigation by the present inventors revealed that an increase in the frequency of the Coriolis vibration of the measuring pipe is rather advantageous if the following modifications are made:

(1) A phase difference between two vibration sensors provided upstream and downstream is detected; and
(2) Vibration of the straight pipe is detected by a speed sensor such as an electromagnetic sensor or an acceleration sensor.

This is because according to the conventional approaches which detect time differences, it has been theoretically clarified that a time difference becomes shorter at higher frequencies of the Coriolis vibration while a phase difference generated by the respective Coriolis forces of the two vibration sensors is greater at higher frequencies of the Coriolis vibration and because speed sensors and acceleration sensors are more sensitive at higher frequencies or for some other reasons.

Furthermore, as described hereinafter, the method in which the frequency of Coriolis vibration is increased by allowing the Coriolis vibration of the measuring pipe to occur in a higher order mode is more advantageous in many respects than the method in which the measuring pipe is allowed to vibrate at the principal natural frequency. For example, influences of external vibrations transmitted from piping or fluid to be measured on the characteristics of the measuring is determined depending on the S/N ratio, i.e., the ratio of the frequency of the Coriolis vibration to the frequencies of the external vibrations.

According to YOKOGAWA GIHO, Vol. 34, No. 1, 1990, pp. 49–52, the frequencies of external vibrations generated by the piping are at most 200 Hz. On the other hand, according to the measurement performed by the present inventors, the noises of the external vibrations generated by the piping and the pressure of the fluid to be measured are in total at most about 600 Hz and, hence, the frequencies of the external vibrations would seem to be at most on the order of several hundreds Hz.

As in the present invention, higher frequencies of the Coriolis vibration of the measuring pipe give rise to much less noises generated in this region, which in combination with a frequency filtering effect of the vibration system itself having a high mechanical Q, is effective to give high S/N ratios.

Use of a speed sensor or acceleration sensor results in an increase in the S/N ratio since such a sensor has a higher sensitivity to vibrations at higher frequencies. Actually, it has been confirmed experimentally that influences of the external vibrations from the piping and the fluctuation of the zero point due to the pressure noise by the fluid to be measured can be suppressed because of the high S/N ratios. Since the frequency of the Coriolis vibration of the measuring pipe and the frequencies of external vibration noises are separated from each other, the rigidity of the inlet and outlet conduits which support the vibration system including the measuring pipe and the supporting mechanism does not have to be so small as in the case of the conventional mass flowmeters so that the mass flowmeter of the present invention is fully resistant to impact forces.

Further, as described above, increasing the frequency of the Coriolis vibration of the measuring pipe using a speed sensor and an acceleration sensor results in an increased sensitivity of the sensor to the Coriolis vibration so that the amplitude of the Coriolis vibration can be decreased. As a result, stresses applied to the measuring pipe can be decreased and thus the reliability of the mass flowmeter can be increased against damages of the measuring pipe which is the most important problem to be solved in respect of Coriolis mass flowmeters.

Furthermore, as will be apparent from a basic knowledge of vibration science, a measuring pipe vibrated in a higher order mode has a portion where vibration occurs in an inverted phase so that movement of the center of the gravity of the entire system is canceled at that portion and, hence, is decreased accordingly so that the energy of the Coriolis vibration does not tend to leak to the outside.

In addition, use of vibration in a higher order mode decreases changes in sensitivity to the mass flow rate due to an axial force exerted on the measuring pipe. This effect is observed when a straight measuring pipe is used. For example, a change in the temperature of the fluid to be measured, will in accordance with a time constant of heat conduction, give rise to a difference or change in temperature between the measuring pipe and the supporting mechanism. This will generate or change an axial force applied to the measuring pipe due to its thermal expansion. As a result, the wave form of a flexural vibration as shown in one of FIGS. 3A to 3C changes and the sensitivity to the mass flow rate changes. The investigation by the present inventors revealed that use of a vibration in a higher order mode decreases the change in sensitivity as described above.

Further, measurement of the ratio of one to the other of any two natural frequencies of the measuring pipe can be used as basic data for calculating an axial force exerted on the measuring pipe.

Therefore, the precision of the mass flow rate measurement can be increased by correcting the change in sensitivity based on the axial force thus obtained. In this case, it is preferred in practice that vibration in the third order mode of the measuring pipe be used as the Coriolis vibration and that the ratio of the natural frequency of the vibration in the third order mode to the natural frequency of the vibration in the first or fifth order mode be obtained.

When the measuring pipe is vibrated in the first or fifth order mode in order to measure such a ratio as described above, of the signal components detected by the vibration sensor, the signal component corresponding to the frequency of the vibration in the first or fifth order mode is made sufficiently small as compared with the signal component according to the frequency of the Coriolis vibration so that the secondary vibration does not adversely influence the Coriolis vibration, the major vibration. Preferably, the signal component corresponding to the frequency of the vibration in the first or fifth order mode is no higher than −40 dB.

DESCRIPTION OF PREFERRED EMBODIMENTS

Hereinafter, the present invention will be described in greater detail by embodiments with reference to the attached drawings. However, the present invention should not be construed as being limited thereto.

EMBODIMENT 1

Figure 4:
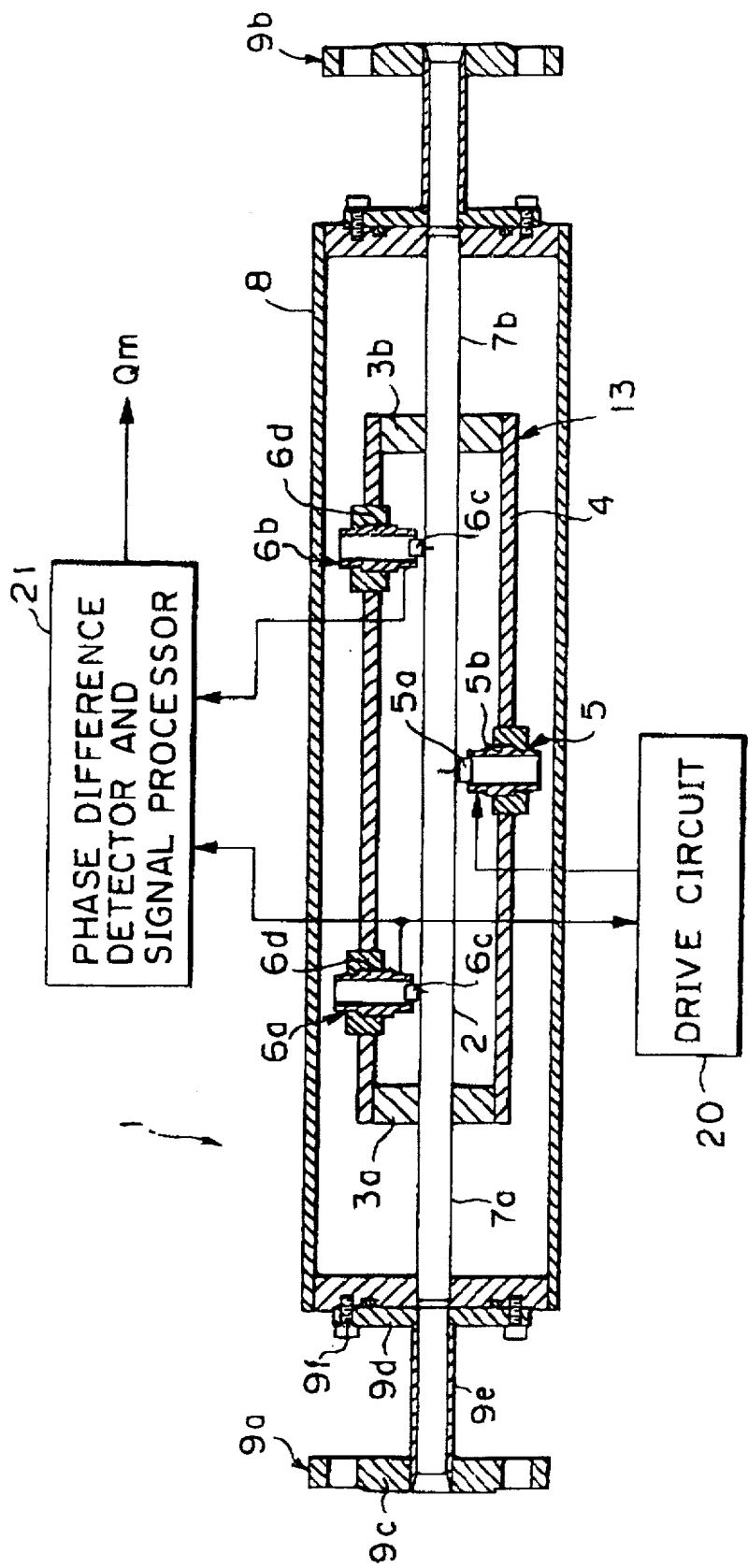
FIG. 4 is a cross sectional view showing a mass flowmeter according to the first embodiment of the present invention.

FIG. 4 is a vertical cross sectional view showing a mass flowmeter according to the first embodiment of the present invention.

A mass flowmeter or measuring device 1 has the following structure: The measuring device 1 includes a linear (straight pipe) measuring pipe 2, fixing members 3a and 3b fixed to both ends of the straight measuring pipe 2, for example, by brazing or welding, and a cylindrical beam 4 fixed to the fixing members 3a and 3b, for example, by welding in order to cancel the vibration of the fixing members 3a and 3b in the direction of the vibration of the straight measuring pipe 2. The fixing members 3a and 3b and the cylindrical beam 4 constitute a supporting mechanism 13 which connects both ends of the straight measuring pipe 2.

A vibration generator 5 for vibrating or oscillating the measuring pipe 2 is provided. The vibration generator 5 includes a magnet 5a and a coil 5b fixed to the cylindrical beam 4. The vibration generator 5 is sandwiched by speed sensors (electromagnetic pickups) 6a and 6b for detecting vibration of the measuring pipe 2. They are arranged so that they are positioned symmetrically with respect to the vibration generator 5. Each of the speed sensors 6a and 6b includes a magnet 6c and a coil 6d fixed to the cylindrical beam 4. In the present embodiment, Coriolis vibration of the measuring pipe 2 is allowed to occur in the third order mode as described hereinafter. Accordingly, speed sensors of the type which have a good sensitivity to high frequency vibrations are suited rather than displacement sensors such as sensors for detecting changes in the amount of light passing between slits. In the present embodiment, two vibration sensors are used. However, more than two vibration sensors may be provided as necessary.

An inlet conduit 7a and an outlet conduit 7b are provided which are connected to the measuring pipe 2 so that the inlet and outlet conduits 7a and 7b communicate with the measuring pipe 2. In the present embodiment, the inlet and outlet conduits 7a and 7b are fabricated solidly to the measuring pipe 2. Of course, they may be fabricated separately from the measuring pipe 2 and then connected thereto as by welding. The inlet and outlet conduits 7a and 7b, which are connected to end portions of a housing 8, serve to introduce and discharge a fluid to be measured into and from the measuring pipe 2, respectively. The housing 8 includes the above described various elements therein and is connected to flanges 9a and 9b by screws or by welding or the like means. The flanges 9a and 9b each comprise a pair of discs 9c and 9d which are parallel to each other, spaced apart, and connected via a cylinder 9e through which the fluid to be measured flows. Each plate 9d is fixed to an end of the housing 8 by means of screws 9f.

With the above-described construction, according to the present embodiment, the straight measuring pipe 2 is driven by the vibration generator 5 and a drive circuit 20 to realize a Coriolis vibration at its natural frequency in the third order mode. For example, the frequency of the Coriolis vibration of the straight measuring pipe 2 is about 4,500 Hz and the principal natural frequency of the supporting mechanism 13 is about 3,000 Hz. Thus, the displacement of the supporting mechanism 13 is suppressed by an inertial control so that leakage of the energy of vibration to the outside is minimized. In particular, the ratio of the frequency of the Coriolis vibration to the principal natural frequency is 1.5, which is more than $\sqrt{2}$ described above. Therefore, in the present embodiment, the effect of suppressing the displacement of the supporting mechanism is more efficient than the conventional elastic control.

The frequency of the Coriolis vibration of the measuring pipe 2 at a level of 4,500 Hz is sufficiently higher than the frequency of the above described external vibration at a level of several hundreds Hz and, hence, the S/N ratio can be increased by separation of the frequencies one from another. Further, the S/N ratio is further increased by the use of speed sensors 6a and 6b having good sensitivities to high frequency vibrations.

The speed sensors 6a and 6b which detect Coriolis vibration of the measuring pipe 2 output signals representing the Coriolis vibration and the output signals are forwarded to a phase difference detector and signal processor (or phase difference detection type signal processing circuit) 21, in which a phase difference between the output signals from the speed sensors 6a and 6b is obtained by a predetermined calculation whose program is stored therein to give the mass flow rate of the fluid which flows in the measuring pipe 2. The results are converted into a predetermined signal or signals and then outputted. A program for this procedure is stored in the circuit 21 or in a memory connected thereto. As will be described in detail hereinafter, when the mass flow rate is to be obtained from the phase difference, Coriolis vibration of the measuring pipe 2 in the third order mode is more advantageous than Coriolis vibration in the first order (principal) mode since the sensitivity of measuring the mass flow rate of a fluid is higher at the third order mode, so that an increase in the precision of measurement can be attained.

Further, as will be described in detail hereinafter, Coriolis vibration of the measuring pipe 2 in the third order mode is more advantageous than Coriolis vibration in the first order (principal) mode since changes in sensitivity to the mass flow rate are decreased due to an axial force exerted on the measuring pipe 2.

EMBODIMENT 2

Figure 5:
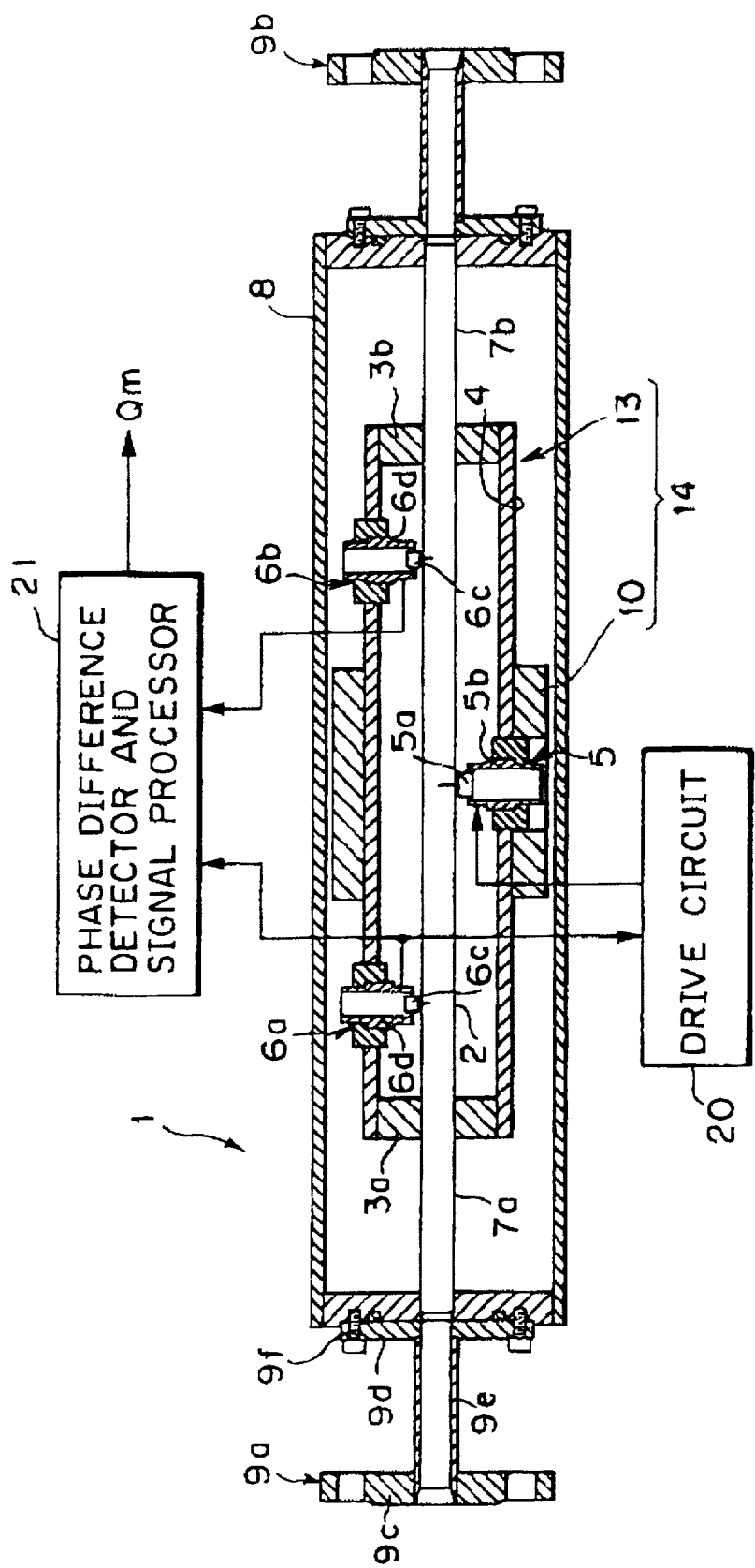
FIG. 5 is a cross sectional view showing a mass flowmeter according to the second embodiment of the present invention.

FIG. 5 is a cross sectional view showing a mass flowmeter according to the second embodiment of the present invention.

The mass flowmeter according to the present embodiment differs from the mass flowmeter according to the first embodiment in that an additional mass 10 is attached to the cylindrical beam 4 in a central part thereof in the axial direction. The additional mass 10 coaxially surrounds the cylindrical beam 4. The lower parts of the additional mass 10 sandwich the vibration generator 5 to form a symmetrical structure. The fixing members 3a and 3b and the cylindrical beam 4 as well as the additional mass 10 constitute a supporting mechanism 14. Although the additional mass 10 makes the entire supporting mechanism 14 heavy, the weight of the cylindrical beam 4 can be increased without increasing the rigidity of the cylindrical beam 4 so that use of the additional mass 10 is effective in reducing the principal natural frequency of the supporting mechanism 14 and, hence, in increasing the effect of the inertial control. In the present embodiment, the additional mass 10 is attached to the cylindrical beam 4 in the central part thereof. However, mass may be attached to both ends, respectively, of the cylindrical beam 4. What is important is to attach the additional mass in appropriate positions so that the natural frequency of the supporting mechanism 14 can be decreased effectively. Particularly, the additional mass 10 attached to the central part in the axial direction of the cylindrical beam 4 is effective in simplifying the structure of the supporting mechanism and in decreasing the principal natural frequency of the supporting mechanism. Further simplification in structure can be realized by fabricating the supporting mechanism 13 and the additional mass 10 by casting, die casting or the like integrally or as one piece.

EMBODIMENT 3

Figure 6:
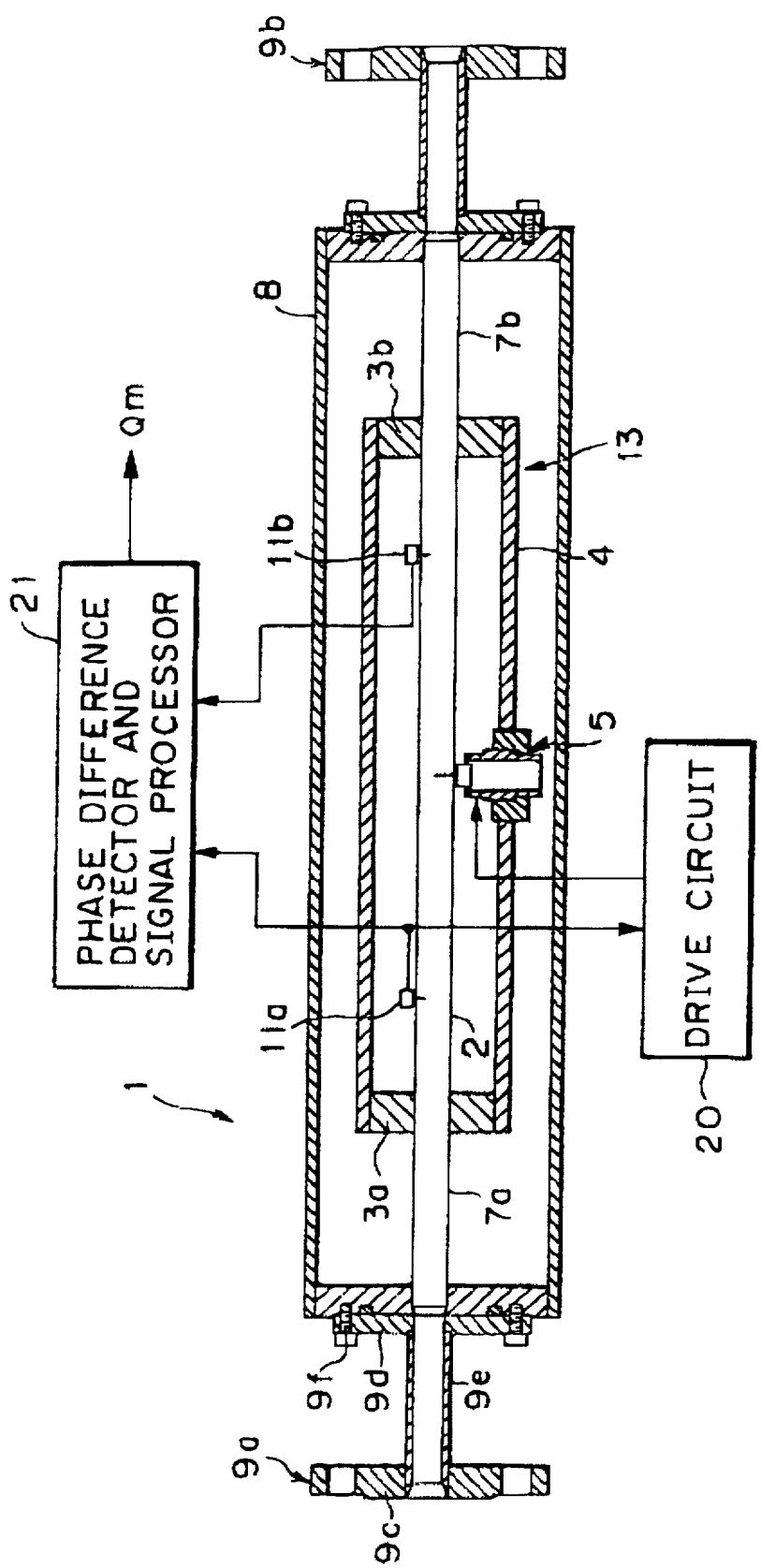
FIG. 6 is a cross sectional view showing a mass flowmeter according to the third embodiment of the present invention.

FIG. 6 is a cross sectional view showing a mass flowmeter according to the third embodiment of the present invention. The mass flowmeter according to the present embodiment differs from the mass flowmeter according to the first embodiment in that the vibration sensors 6a and 6b were replaced by acceleration sensors 11a and 11b. This is because use of acceleration sensors further increases the sensitivity and the S/N ratio at higher frequencies since speed and acceleration are proportional to $\omega$ and $\omega^2$, respectively. The increase in sensitivity permits one to decrease the amplitude of the Coriolis vibration of the measuring pipe 2 so that stresses exerted on the measuring pipe 2 can be decreased, with the result being that reliability of the measuring pipe against damages (which is most important for Coriolis mass flowmeters) can be improved.

EMBODIMENT 4

Figure 7:
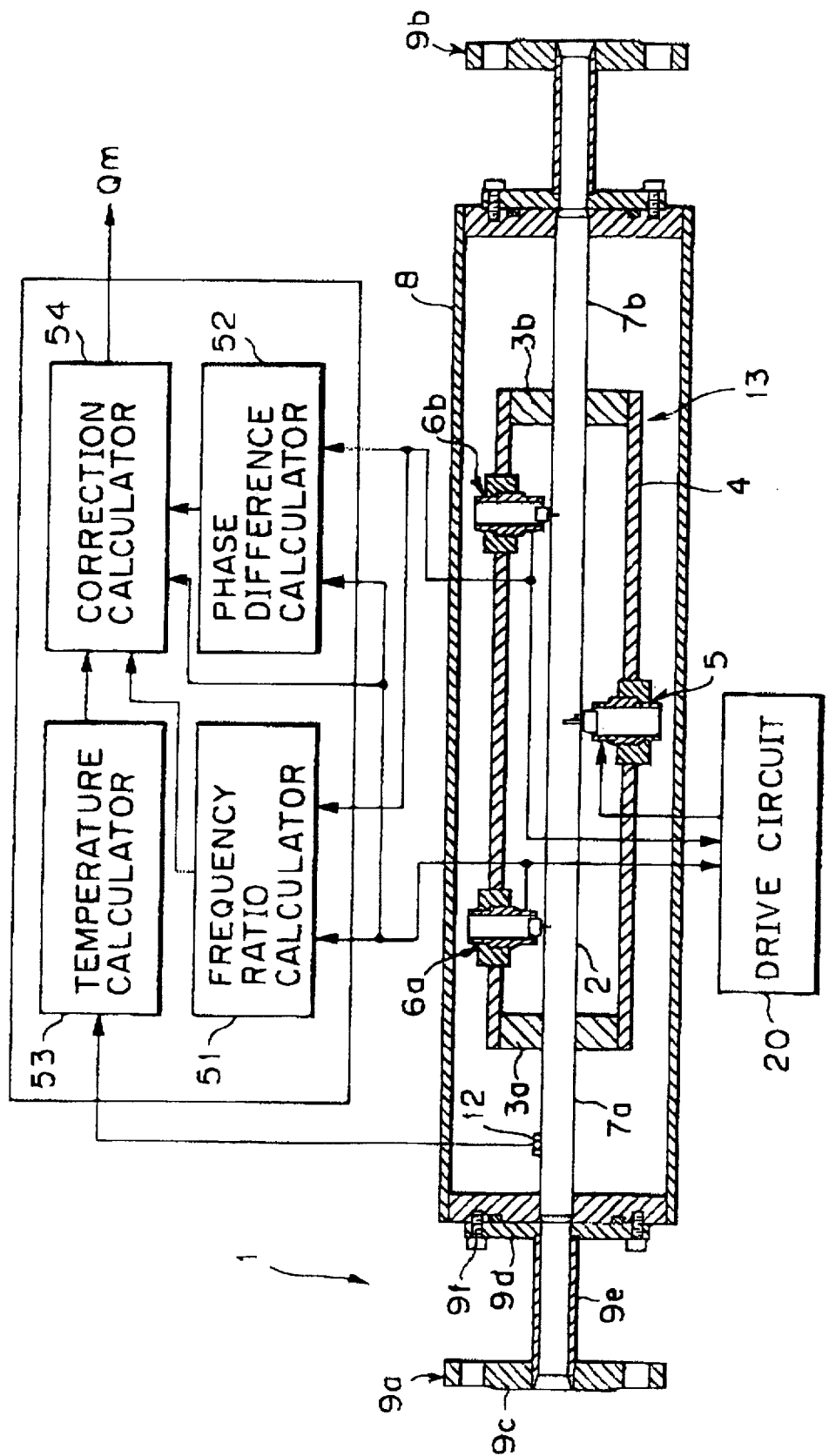
FIG. 7 is a cross sectional view showing a mass flowmeter according to the fourth embodiment of the present invention.

FIG. 7 is a cross sectional view showing a mass flowmeter according to the fourth embodiment of the present invention. The mass flowmeter according to the present embodiment differs from the mass flowmeter according to the first embodiment in that in the present embodiment, two natural frequencies of the measuring pipe 2 are measured, ratios of one to the other are obtained, phase differences measured are corrected to give final mass flow rates, and these are converted into predetermined signals and outputted. In a mass flowmeter having a straight measuring pipe 2 as in the present embodiment, an axial force is exerted on the measuring pipe 2 due to, for example, a temperature difference between the measuring pipe 2 and the supporting mechanism 13. The axial force causes changes in the wave form of flexural vibration of the measuring pipe 2 as shown in FIGS. 3A to 3C and, hence, the sensitivity of measurement to the mass flow rate. This is a cause of errors in measurement. Accordingly, high precision measurement of a mass flow rate is realized according to the present embodiment by correcting the measured value of the mass flow rate in accordance with the axial force, which is obtained by measuring the two natural frequencies of the measuring pipe 2 and obtaining the ratio of one to the other.

Here, in the same manner as in the first embodiment, Coriolis vibration in the third order vibration mode of the measuring pipe 2 is allowed to occur by means of the drive circuit 20 and the vibration generator 5. In order to obtain the ratio of natural frequencies, the measuring pipe 2 is also vibrated in the first or fifth order mode. In this case, in the signal components detected by the vibration sensors 6a and 6b, the signal component for the first or fifth order mode is made sufficiently low, preferably as low as no higher than −40 dB as compared with the signal component for the Coriolis vibration, so that the vibration in the first or fifth order mode does not adversely influence the Coriolis vibration.

The phase difference detector and signal processor 21 includes a frequency ratio calculator 51, a phase difference calculator 52, a temperature calculator 53, and a correction calculator 54. The frequency ratio calculator 51 calculates the ratio of the natural frequency of the third order mode vibration to the natural frequency of the first or fifth order mode vibration from signals from the vibration sensors 6a and 6b and forwards the results to the correction calculator (or correction calculating portion) 54. The phase difference calculator (or phase difference calculating portion) 52 calculates a phase difference between the output signals from the two vibration sensors 6a and 6b according to a predetermined well known calculation procedure and forwards the results to the correction calculator 54.

Further, in the present embodiment, a temperature sensor 12 such as a temperature indicating resistor or a thermocouple is provided on the outer surface of the inlet conduit 7a or the outlet conduit 7b for temperature correction. The sensor 12 measures the temperature of the measuring pipe 2 and this permits correction for temperature dependent changes in the mechanical properties such as Young's modulus of the measuring pipe 2. Generally, in the case of the mass flowmeter according to the present embodiment, the temperature dependent changes of the mechanical properties such as Young's modulus of the measuring pipe 2 cause changes in the phase difference generated corresponding to the mass flow rate (cf. equations (3) to (13) below, particularly equation (8) in which yc(x) is a function of E). Accordingly, temperature correction is necessary. The temperature sensor 12 is fabricated integrally to the measuring pipe 2 in order not to adversely influence the Coriolis vibration of the measuring pipe 2 and, as was mentioned before, is located at the inlet conduit 7a or the outlet conduit 7b. The temperature calculator (temperature calculating portion) 53 receives temperature data signals from the temperature sensor 12 and obtains the temperature and forwards the results to the correction calculator 54.

The correction calculator 54 makes a correction to the phase difference data from the phase difference calculator 52 for changes in the sensitivity of the phase difference to the mass flow rate due to axial force based on the ratio of natural frequencies from the frequency ratio calculator 51 and/or for Young's modulus E or the like mechanical properties of the measuring pipe 2 based on the temperature data from the temperature calculator 53. Further, the correction calculator 54 makes a correction to the phase difference based on the frequency of the Coriolis vibration of the measuring pipe calculated from the signals outputted by the vibration sensor 6a (cf. equations (3) to (13) hereinbelow for the frequency dependence of the phase difference, particularly equation (8) in which yc(x) contain $\omega_0$).

By the above-described corrections, the precision of the measurement of mass flow rate is increased and the data are converted into signals and outputted as Qm by the correction calculator 54.

FURTHER CONSIDERATIONS

The following discussion is provided to further explain various effects described above based on the measurements with the measuring pipe vibrated in the first and third order modes, respectively.

1) Phase difference generated:

The phase difference generated between two vibration sensors arranged in symmetrical positions with respect to the center of the measuring pipe 2, considered as an ideal straight measuring pipe with both its ends fixed and having a uniform cross section, when fluid is in such a measuring pipe and the pipe is vibrated as shown in FIGS. 3A to 3C, is as follows. First, the displacement Y(x,t) by a natural vibration of the measuring pipe is expressed by the following equation (3):

$$Y(x,t)=y(x)\cdot\sin(\omega_0 t) \quad (3)$$

$$y(x)=D\{\cos(\lambda x/L)+\alpha\sin(\lambda x/L)-\cos h(\lambda x/L)-\alpha\sin h(\lambda x/L)\} \quad (4)$$

$$\alpha=(\cos h\lambda-\cos\lambda)/(\sin\lambda-\sin h\lambda) \quad (5)$$

$$\omega_0=\lambda^2\sqrt{EI/\rho L^4} \quad (6)$$

where the various symbols have the following meanings:

L: length of the measuring pipe;
E: Young's modulus E of the measuring pipe;
I: moment of inertia of area of the measuring pipe;
ρ: linear density of the measuring pipe (inclusive of the fluid to be measured;
D: constant proportional to the amplitude of vibration;
λ: constant varying depending on the mode of vibration:
  first order mode:4.7300
  second order mode:7.8532
  third order mode:10.9956

$\omega_0$: natural angular frequency for each mode.

1. Next, the displacement Yc(x,t) of the flexure of the measuring pipe due to Coriolis force generated when the fluid in the measuring pipe flows is expressed by the following equation (7) in which Qm is mass flow rate:

$$Yc(x,t)=yc(x)\cdot\cos(\omega_0 t) \quad (7)$$

$$yc(x)=2Qm\omega_0 DL^3/(EI\lambda 3)\cdot\{\sin(\lambda x/L)-\alpha\cos(\lambda x/L)+\sin h(\lambda x/L)+\alpha\cos h(\lambda x/L)-C_1(x/L)^3-C_2(X/L)^2-2\lambda x/L\} \quad (8)$$

$$C_1=\lambda\beta_1-2\beta_2+2\lambda \quad (9)$$

$$C_2=\lambda\beta_1+3\beta_2-4\lambda \quad (10)$$

$$\beta_1=\cos\lambda+\alpha\sin\lambda+\cos h\lambda+\alpha\sin h\lambda \quad (11)$$

$$\beta_2=\sin\lambda-\alpha\cos\lambda+\sin h\lambda+\alpha\cos h\lambda \quad (12)$$

The displacement of the measuring pipe is the sum of Y(x,t)+Yc(x,t) and the phase difference α generated between the outputs from the two vibration sensors arranged in symmetrical positions with respect to the center of the measuring pipe is expressed by equation (13):

$$\alpha=2\tan^{-1}\{yc(x)/y(x)\} \quad (13)$$

As will be understood from the above explanation, the phase difference a that is generated varies explanation, depending on the vibration mode and the positions of the sensors. The phase difference a was calculated under the condition that the flow rate for the first and third order modes was the same, and plotted in a graph with the sensor position x/L being represented along the horizontal axis (FIG. 8).

The constants used are:
L: 0.252 (m)
E: 0.1932E+12 (Pa)
I: 531E−12 (m$^4$)
ρ: 0.321 (Kg/m)
Qm: 100 (Kg/min)

Figure 8:
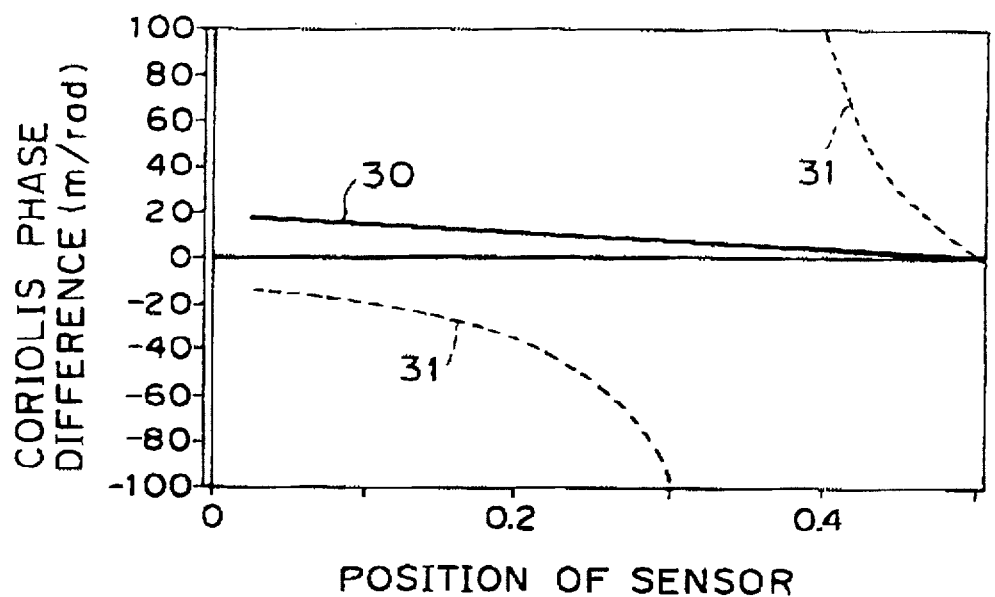
FIG. 8 is a graph illustrating a phase difference generated in accordance with the position of the sensor.

FIG. 8 shows that the magnitude of the phase difference for different modes varies depending upon the position of the sensors. In FIG. 8, 30 and 31 are sensitivity curves for first and third order mode vibrations, respectively. Meaningful measurements cannot be performed unless the positions of the sensors are determined at appropriate positions so that the phase difference is large and that the sensitivity of the sensors for detecting vibration is sufficiently high, i.e., the amplitude of the vibration of the measuring pipe is sufficiently high. In order to satisfy both requirements, usually the sensors are attached at the position of x/L=about 0.2 for both first and third order mode vibrations. In this region, the third order mode vibration (31) provides a phase difference which is 2 to 5 times as large as the phase difference obtained by the first order mode vibration (30) (FIG. 8).

2) Sensitivity of detecting vibration (stress generated in the measuring pipe upon vibration):

The stress generated by the natural vibration of an ideal straight measuring pipe fixed at both ends thereof and having a uniform cross section, when vibrated as illustrated in FIGS. 3A to 3C, is proportional to twice differentiated y(x) described above as equation (4) and reaches maximum at x=0, i.e., at the fixed end for both first and third order modes. The sensitivity of the sensor has been calculated when the maximum stress at the fixed end is made constant, and the results are plotted in graphs with the position x/L of the sensor being depicted along the horizontal axis as shown in FIGS. 9 and 10.

Figure 9:
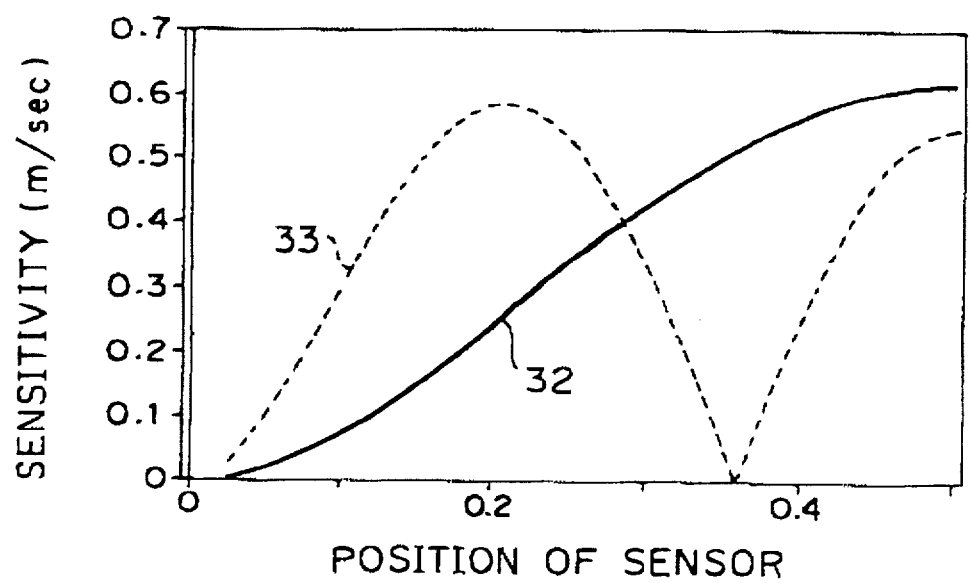
FIG. 9 is a graph illustrating the relationship between the position of the sensor and the vibration speed when the stress generated at a fixed end of the measuring pipe is constant.

In FIG. 9, 32 and 33 are sensitivity curves for the first and third order mode vibrations respectively. In FIG. 10, 34 and 35 are sensitivity curves for first and third order mode vibrations, respectively.

FIG. 9 indicates the sensitivity of a speed sensor in terms of the speed of vibration (m/sec) (plotted along the vertical axis) and illustrates the variation of the sensitivity (output) of the sensor depending on the position x/L of the sensor and the mode of vibration when the measuring pipe is vibrated so that the stress at the fixed end is at a constant level. FIG. 10 is a graph similar to the graph illustrated in FIG. 9 except that the vertical axis indicates acceleration of the vibration of the measuring pipe and the sensor is an acceleration sensor.

Figure 10:
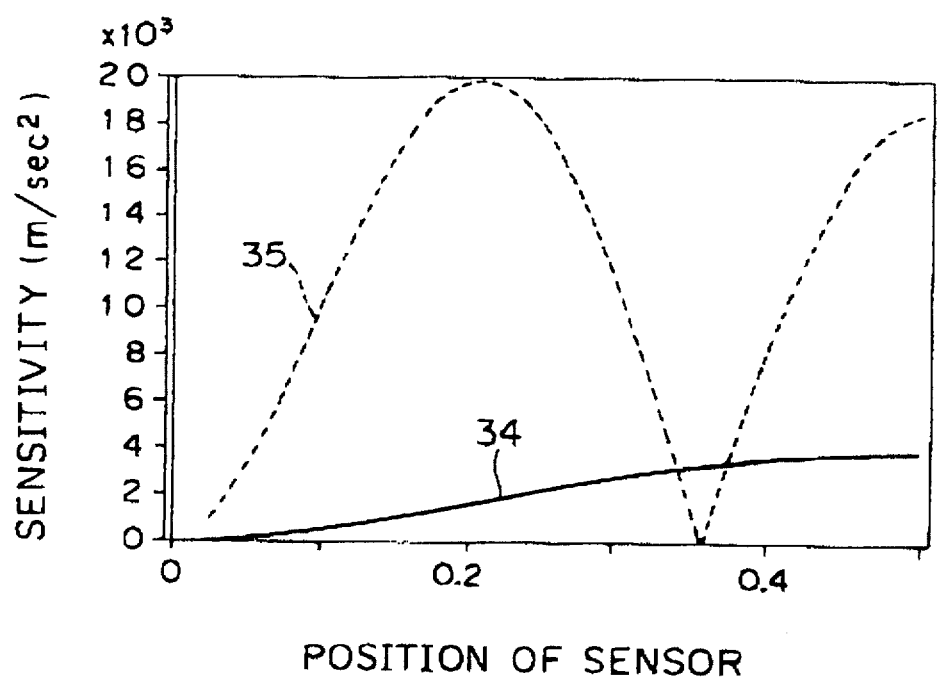
FIG. 10 is a graph illustrating the relationship between the position of the sensor and vibration acceleration when the stress generated at a fixed end of the measuring pipe is constant.

As illustrated in FIGS. 9 and 10, at the ordinary position of the sensors (x/L=about 0.2), use of the third order mode vibration gives a sensitivity about twice as high as that obtained by using the first order mode vibration in the case where speed sensors are used, while with acceleration sensors, use of the third order mode vibration gives a sensitivity about ten times as high as that obtained by using the first order mode vibration. If the amplitude of the vibration is decreased by the amount of the increment in sensitivity, then the stress generated in the measuring pipe is decreased accordingly.

3) Change in sensitivity of the mass flow rate measurement (generated phase difference) due to axial force exerted on the measuring pipe:

In the case where a straight measuring pipe is used, a problem arises. That is, when a difference in temperature is generated or the temperature changes between the measuring pipe and the supporting mechanism due to for example, temperature variation of the fluid to be measured and time constant heat conduction, an axial force is generated in the measuring pipe or such a force changes due to thermal expansion. This results in a change in the wave form of the flexural vibration and the sensitivity of the measurement of the mass flow rate, i.e., there is a change in the generated phase difference described above.

Figure 11:
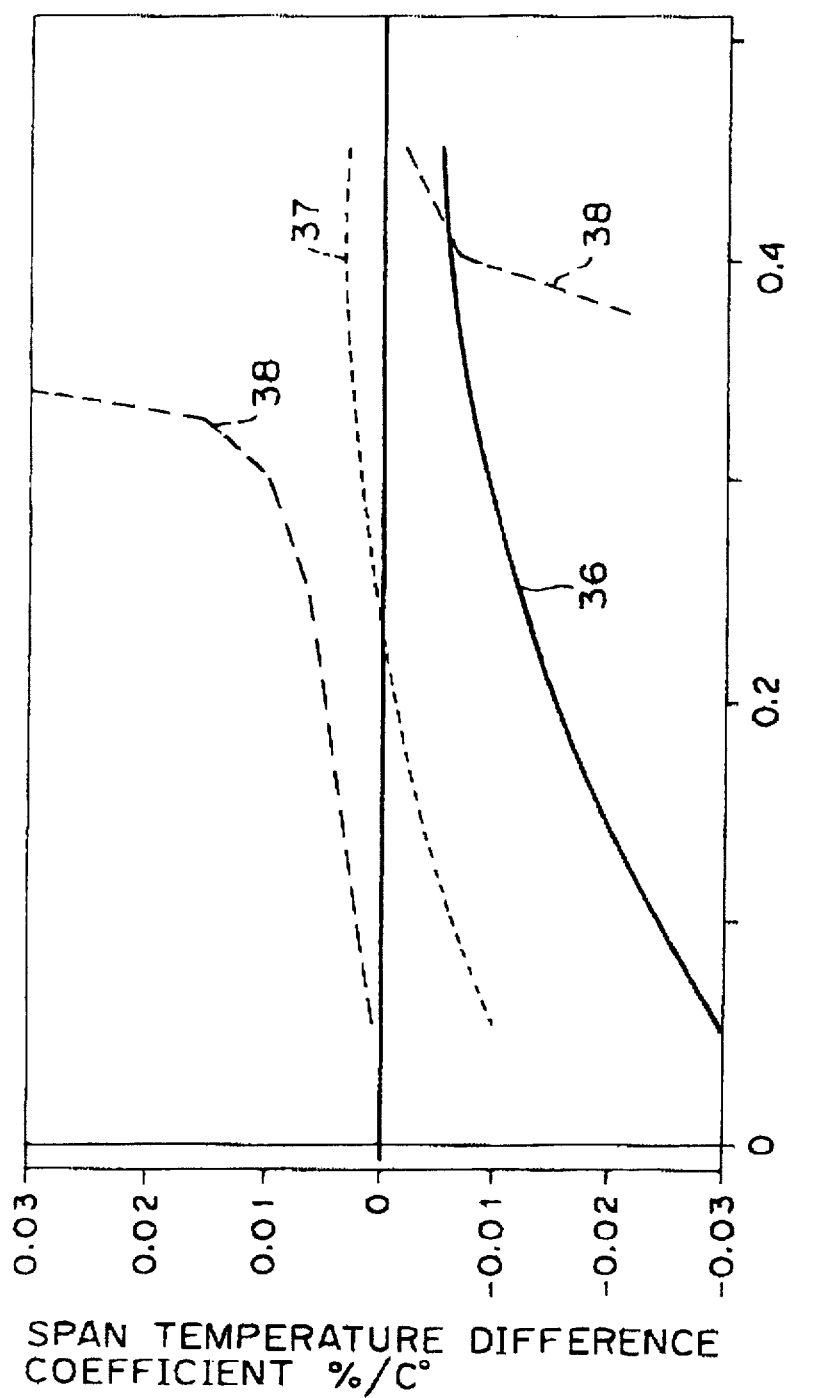
FIG. 11 is a graph illustrating the relationship between the position of the sensor and the span temperature difference coefficient of the measuring pipe.

FIG. 11 illustrates the results of calculation of the change in the generated phase difference for an ideal straight measuring pipe fixed at both ends thereof and having a uniform cross section when the pipe is vibrated as illustrated in FIGS. 3A to 3C. In FIG. 11, the horizontal axis indicates the position x/L of the sensor while the vertical axis indicates % change in span (generated phase difference) due to an axial force generated when the temperature difference between the measuring pipe and the supporting mechanism changes by 1° C.

FIG. 11 illustrates the results of calculation of data for first, second and third order mode vibrations. In FIG. 11, 36, 37 and 38 are sensitivity curves for first, second and third order mode vibrations, respectively. The degree of change in span or generated phase difference due to the axial force varies depending on the position of the sensor and the vibration mode. If the position of the sensor is x/L=about 0.2, using the third order mode vibration can decrease the change to about ½ to ⅕ times as great as that obtained with the first order mode, while using the second order mode vibration can decrease the change further.

By obtaining the generated axial force from the ratio of natural frequencies and utilizing coefficients which are obtained from FIG. 11, the change in the sensitivity of the measurement of the mass flow rate can be corrected.

4) Experimental Data

Figure 12:
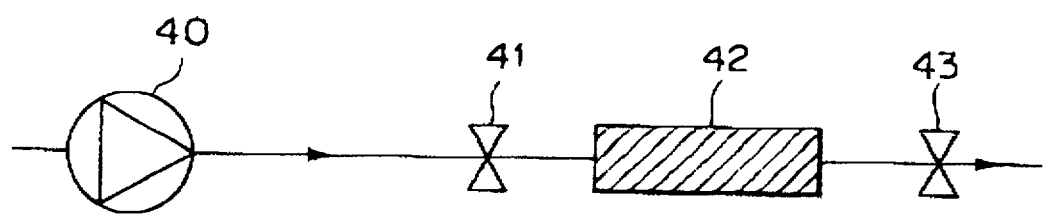
FIG. 12 is a schematic diagram showing a mass flowmeter in an arrangement for conducting tests.

In order to estimate the degree of improvement in the S/N ratio, for example, the fluctuation of the zero point with respect to external vibrations was considered using mass flowmeter arranged as shown in FIG. 12. In FIG. 12, a mass flowmeter 42 is connected to upstream and downstream valves 41 and 43 at the ends thereof, respectively. A pump 40 is connected to the mass flowmeter 42 through the upstream valve 42. The fluid to be measured flows from the pump 40 through the upstream valve 41 into the mass flowmeter 42 and then to the outside through the downstream valve 43. The measurements were made using the first and third order modes, respectively, under the following conditions:

Condition I: The pump 40 is stopped (i.e., external vibration is almost null);

Condition II: The pump 40 is in operation and the upstream valve 41 is closed (i.e., the vibration 15 of the pump 40 is transmitted to the mass flowmeter 42);

Condition III: The pump 40 is in operation and the downstream valve 43 is closed (the vibration of the pump 40 is transmitted through the piping and the fluid to be measured).

The apparatus employed is substantially the same as that described in Embodiment 1 above and uses speed sensors (electromagnetic sensors) as the vibration sensors. The natural frequency of the vibration in the first order mode is 1,000 Hz, which is lower than that of the supporting mechanism, i.e., in an elastic control region.

FIGS. 13A to 13F illustrate the fluctuation of a zero point recorded on an automatic recorder under the above-described conditions. FIGS. 13A to 13C relate to third order mode vibrations and FIGS. 13D to 13F relate to first order mode vibrations. FIGS. 13A and 13D relate to Condition I, FIGS. 13B and 13E relate to Condition II, and FIGS. 13C and 13F relate to Condition III The fluctuations shown in FIGS. 13A to 13F were read peak to peak and the results were expressed in percentages taking the Upper Range Limit (URL) as 100. Table 1 shows the results.

TABLE 1

| | Fluctuation of Zero Point (% URL) | | |
|---|---|---|---|
| | Condition I | Condition II | Condition III |
| First order mode | 0.072 | 0.083 | 0.183 |
| Third order mode | 0.014 | 0.026 | 0.028 |

The present invention has been described in detail with respect to several embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A Coriolis mass flowmeter comprising:

a housing;

at least one measuring pipe contained in said housing, said at least one measuring pipe enabling measurement of a flow rate of a fluid which flows in said pipe under application of a vibration which generates a Coriolis force in said flowing fluid;

a supporting mechanism connected to both ends of said measuring pipe, said supporting mechanism having a principal natural frequency;

a vibration generator which imparts vibration to said measuring pipe;

at least two sensors for detecting the vibration of said measuring pipe;

an inlet conduit which introduces a fluid to be measured into said measuring pipe; and an outlet conduit which discharges said fluid out of said measuring pipe;

wherein said Coriolis vibration applied to said measuring pipe has a frequency which is at least $\sqrt{2}$ times as high as the principal natural frequency of said supporting mechanism.

2. The Coriolis mass flowmeter as claimed in claim 1, wherein said supporting mechanism further comprises an additional mass.

3. The Coriolis mass flowmeter as claimed in claim 2, wherein said supporting mechanism and said additional mass are integral to each other.

4. The Coriolis mass flowmeter as claimed in claim 1, wherein said Coriolis vibration applied to said measuring pipe is of a higher order mode than a principal natural vibration of said measuring pipe.

5. The Coriolis mass flowmeter as claimed in claim 4, wherein said mass flowmeter measures a flow rate of said fluid flowing through said measuring pipe based on a phase difference between signals from said at least two vibration sensors.

6. The Coriolis mass flowmeter as claimed in claim 4, wherein said at least two vibration sensors comprise each a speed sensor.

7. The Coriolis mass flowmeter as claimed in claim 5, wherein said at least two vibration sensors comprise each an acceleration sensor.

8. The Coriolis mass flowmeter as claimed in claim 1, wherein said measuring pipe comprises a straight pipe and wherein said mass flowmeter corrects a flow rate value based on any two natural frequencies of said measuring pipe.

9. The Coriolis mass flowmeter as claimed in 8, wherein said two natural frequencies used for the correction of the flow rate comprises natural frequencies of said Coriolis vibration in first and third order modes.

10. The Coriolis mass flowmeter as claimed in 8, wherein said two natural frequencies used for the correction of the flow rate comprises natural frequencies of said Coriolis vibration in first and fifth order modes.

11. The Coriolis mass flowmeter as claimed in claim 9, wherein a signal component for tire frequency of said first or fifth order mode vibration detected by said vibration sensors is made smaller than a signal component for the frequency of said Coriolis vibration detected by said vibration sensors.

12. The Coriolis mass flowmeter as claimed in claim 9, wherein a signal component for the frequency of said first or fifth order mode vibration detected by said vibration sensors is no higher than −40 dB.

13. The Coriolis mass flowmeter as claimed in claim 4, wherein said supporting mechanism further comprises an additional mass.

14. The Coriolis mass flowmeter as claimed in claim 4, wherein said supporting mechanism and said additional mass are integral to each other.

15. The Coriolis mass flowmeter as claimed in claim 8, wherein said supporting mechanism further comprises an additional mass.

16. The Coriolis mass flowmeter as claimed in claim 8, wherein said supporting mechanism and said additional mass are integral to each other.

17. The Coriolis mass flowmeter as claimed in claim 8, wherein said Coriolis vibration applied to said measuring pipe is of a higher order mode than a principal natural vibration of said measuring pipe.

18. The Coriolis mass flowmeter as claimed in claim 17, wherein said mass flowmeter measures a flow rate of said fluid flowing through said measuring pipe based on a phase difference between signals from said at least two vibration sensors.

19. The Coriolis mass flowmeter as claimed in claim 17, wherein said at least two vibration sensors comprise each a speed sensor.

20. The Coriolis mass flowmeter as claimed in claim 17, wherein said at least two vibration sensors comprise each an acceleration sensor.

21. The Coriolis mass flowmeter as claimed in claim 10, wherein a signal component for the frequency of said fifth order mode vibration detected by said vibration sensors is made smaller than a signal component for the frequency of said Coriolis vibration detected by said vibration sensors.

22. The Coriolis mass flowmeter as claimed in claim 10, wherein a signal component for the frequency of said fifth order mode vibration detected by said vibration sensors is no higher than −40dB.

23. The Coriolis mass flowmeter as claimed in claim 10, wherein said measuring pipe has vibration nodes where said supporting mechanism is connected, and wherein said frequency of said Coriolis vibration applied to said measuring pipe is such that at least one additional vibration node is present in said measuring pipe between said vibration nodes where said supporting mechanism is connected.

24. A Coriolis mass flowmeter for measuring the mass flow rate of a fluid, comprising:

a measuring pipe through which the fluid flows;

a support mechanism which includes first fixing means, contacting the measuring pipe, for defining a first vibration node of the measuring pipe, second fixing means, contacting the measuring pipe, for defining a second vibration node of the measuring pipe, and means for connecting the first and second fixing means;

a vibration generator to vibrate the measuring pipe, the vibration generator vibrating the measuring pipe at a frequency such that at least one additional vibration node is present in the measuring pipe between the first and second vibration nodes thereof, and sensor means for sensing the vibration of the measuring pipe, wherein the support mechanism has a principal natural frequency of oscillation, and the frequency of vibration of the measuring pipe is at least $\sqrt{2}$ times as high as the principal natural frequency of the support mechanism.

25. The Coriolis mass flowmeter of claim 24, wherein the first and second fixing means are attached to the measuring pipe.

26. The Coriolis mass flowmeter of claim 24, wherein the vibration generator vibrates the measuring pipe so as to excite a plurality of modes of oscillation thereof.

* * * * *